W. T. Freligh,
Lock Hinge.
No. 95,101.  Patented Sep. 21. 1869.
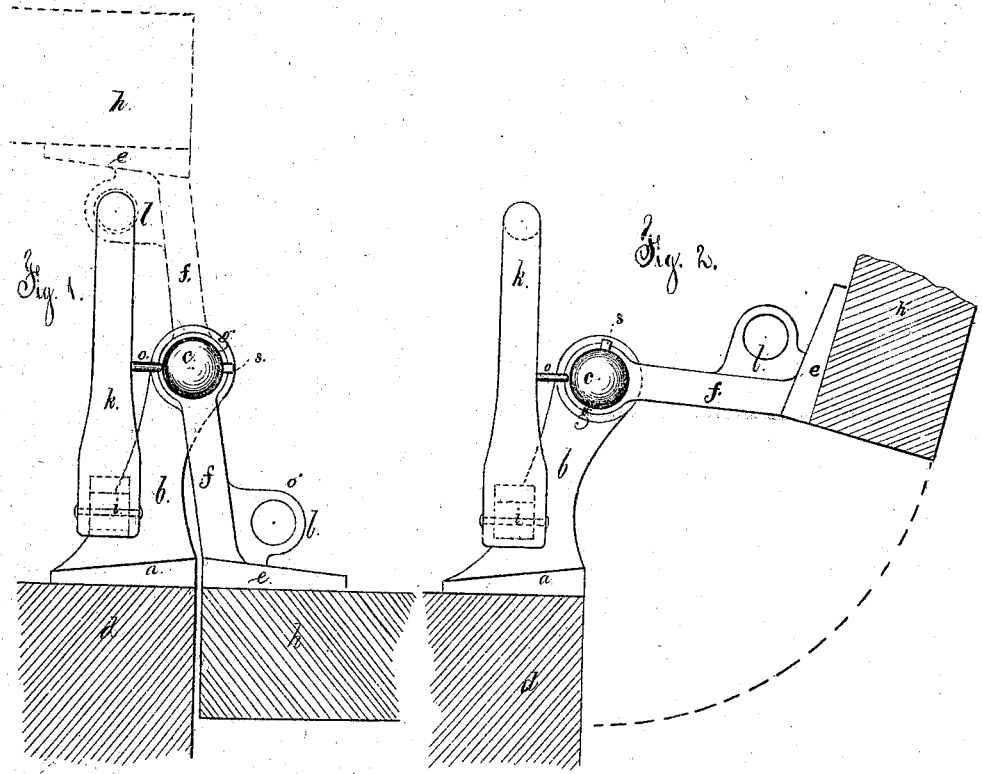
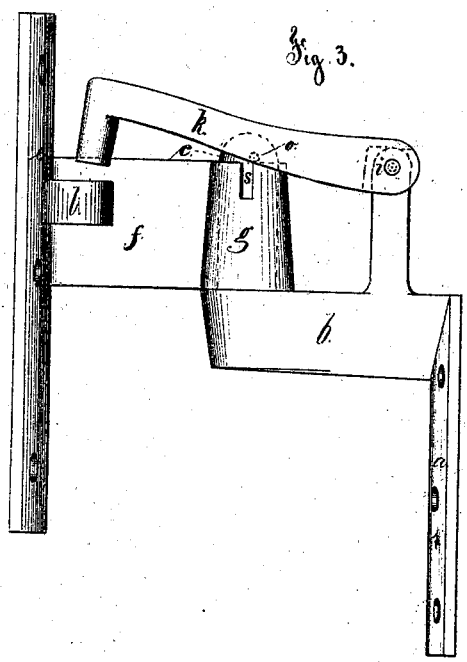
Witnesses,
Geo. D. Walker
Chas. H. Smith
Inventor
William T. Freligh

United States Patent Office.

WILLIAM T. FRELIGH, OF JERSEY CITY, NEW JERSEY.

Letters Patent No. 95,101, dated September 21, 1869.

IMPROVED HINGE FOR BLINDS.

The Schedule referred to in these Letters Patent and making part of the same

*To all whom it may concern:*

Be it known that I, WILLIAM T. FRELIGH, of Jersey City, in the county of Hudson, and State of New Jersey, have invented and made a certain new and useful Improvement in Blind-Fastenings; and I do hereby declare the following to be a full, clear, and exact description of the said invention, reference being had to the annexed drawing, making part of this specification, wherein—

Figure 1 is a plan of said fastening, with the blind closed;

Figure 2 is a similar view, with the blind partly opened; and

Figure 3 is an elevation of the hinge and fastening, in the position that the parts assume just before the hook drops, to fasten the blind open.

Similar marks of reference denote the same parts.

This invention consists in a hook, having its fulcrum upon the stationary portion of the blind-hinge, and supported by a pin that rests upon the eye of the moving portion of the hinge, in which eye is a notch that allows the hook to fall into a catch on the swinging portion of the hinge, when the blind is open, and thereby retain the same in that position until the hook is lifted, for allowing the blind to be closed.

In the drawing—

*a* is the plate;

*b*, the arm; and

*c*, the vertical pin, forming the stationary portion of the blind-hinge, that is to be attached to the window-casing *d*, as usual.

*e* represents the plate;

*f*, the arm; and

*g*, the eye of the swinging portion of the hinge, that is to be attached to the blind *h*, in any usual manner, and these parts are to be of the desired size or proportion, according to the relative positions of the window-frame and the surface of the wall or outside of the building, against which the blind is to swing when opened.

*k* is a hook, that is hinged, at *i*, to the arm *b*, or plate *a*, so as to swing on this hinge as a fulcrum.

*l* is a catch or eye, upon the plate *e*, into which the hook *k* passes, to hold the blind open when swung back, as seen by dotted lines in fig. 1.

In order to make this hook *k* self-acting, I introduce the pin or projection *o*, that rests upon the upper edge of the eye *g*, and holds the end of the hook *k* sufficiently high to allow the catch or eye *l* to swing under it, and a notch, *s*, in this eye *g*, is so located that it allows the pin *o* and hook *k* to descend, when the blind is opened, so that the hook *k* falls into said eye *l*.

This hook *k* is in a position that is accessible easily from the window, without having to reach out in the manner most usually resorted to.

What I claim, and desire to secure by Letters Patent, is—

The hinged hook *k*, sustained by the pin *o* upon the eye *g*, but allowed to drop and take the catch *l*, when the notch *s* comes below said pin *o*, as set forth.

In witness whereof, I have hereunto set my signature, this 25th day of January, A. D. 1868.

WILLIAM T. FRELIGH.

Witnesses:
CHAS. H. SMITH,
GEO. D. WALKER.